Aug. 16, 1966  G. C. HAACKE  3,266,290

MEASUREMENT OF THERMAL CONDUCTIVITY

Filed March 19, 1964

INVENTOR.
GOTTFRIED CHRISTIAN HAACKE

BY
Samuel Branch Walker
ATTORNEY

3,266,290
MEASUREMENT OF THERMAL CONDUCTIVITY
Gottfried Christian Haacke, Stamford, Conn., assignor to American Cyanamid Company, New York, N.Y., a corporation of Maine
Filed Mar. 19, 1964, Ser. No. 353,204
1 Claim. (Cl. 73—15)

This invention relates to the measurement of thermal conductivity, particularly of semi-conductors, by placing the semi-conductor adjacent to and in good heat transfer relationship with a heat source and also a heat sink, with the heat sink being cooled by radiation, and after calibration, establishing the thermal conductivity as a function of the temperatures of the heat source, the heat sink, and an environmental shield. Over a preferred selected range, a straight line function is obtained.

Commonly, thermal conductivity has been measured by measuring the heat flowing from a heat source through the specimen or sample to a heat sink. Classically, the heat source and the heat sink are at constant temperatures and either the heat input to the heat source or the heat delivered to the heat sink has been measured. Whereas such a method gives excellent results with the metals, whose thermal conductivity is high, with semi-conductors and other materials whose heat conductivity is in an intermediate range so much heat is lost through conduction along heater wires, clamping devices and shields that the control of thermal losses became so cumbersome as to either require unduly complex equipment or deleteriously affect the accuracy and reproducibility of the measurements.

It has now been found that the amount of heat flowing through a sample can be measured by methods free from such weaknesses. In the new method, use is made of the fact that if the sample is placed in an evacuated chamber in good thermal contact with a constant temperature heat source and a heat sink, and the chamber itself is kept at a uniform temperature, the heat flowing from the heat source to the heat sink can be conveniently determined by measuring the temperature of the heat sink and the chamber; and by a minimum of shielding, heat losses by radiation can be kept to a low value. The amount of heat dissipated by radiation from the heat sink to the chamber walls can be calculated from the Stefan-Boltzmann law. With the sample cross-section and sample length known, the thermal conductivity can be measured by merely determining three temperatures, after calibration of the instrument.

By suitable selection of the sample size, heat sink size, and temperatures; at a constant source and chamber temperature, a plot of the logarithm of the thermal conductivity against temperature of the heat sink is a straight line over a useful range.

The heat losses from the sample surface by radiation can be kept negligibly small and with this simplifying assumption, which is justified in practice, the heat received and radiated by the heat sink, under equilibrium conditions, is set forth in the following equation:

$$\left(\frac{q}{l}\right)\kappa(T_1-T_x) = C\epsilon F(T_x^4 - T_0^4) \quad (I)$$

where:

$q$ is the sample cross-section in square centimeters,
$l$ is the sample length in centimeters,
$T_1$ is the temperature of the heat source in degrees Kelvin,
$T_x$ is the temperature of the heat sink in degrees Kelvin,
$T_0$ is the temperature of the inside surface of the chamber surrounding the heat sink in degrees Kelvin,
$C = 5.67 \ (10^{-4})$ watts/sq. cm.·degrees$^4$; the Stefan-Boltzmann constant,
$\epsilon$ is the net emissivity—a dimensionless ratio of the actual emission to that of a black body (epsilon),
$F$ is the surface area of the heat sink in sq. cm., and
$\kappa$ is the thermal conductivity in watts/cm.·degree (kappa).

Other consistent units of measurement may, of course, be used instead.

Rewritten, Equation I becomes:

$$\kappa = \frac{(C \cdot l \cdot F)}{q} \frac{(T_x^4 - T_0^4)}{T_1 - T_x} \quad (II)$$

For a constant size of sample and the same heat sink if $\epsilon$ is known $\kappa$ is readily determined from measurements of $T_0$, $T_1$ and $T_x$. Conveniently, $\epsilon$, the net emissivity is determined by measurement. If the surface of an area $F_1$ and emissivity, $\epsilon_1$, is completely enclosed by another surface with area $F_2$ and emissivity $\epsilon_2$ the net emissivity $\epsilon$ is given by $$\epsilon = \frac{1}{\frac{1}{\epsilon_1} + \frac{F_1}{F_2}\left(\frac{1}{\epsilon_2}\right) - 1}$$

Under the conditions such that $\epsilon_2$ is nearly 1 and a small $F_1/F_2$ the net emissivity $\epsilon$ is equal to the emissivity of the heat sink. The heat sink emissivity can be obtained in two ways: (1) The surface of the heat sink is made of a material with well known $\epsilon$; (2) The emissivity is determined by Equation II using a calibrated thermal conductivity standard. The latter is particularly convenient. The values of $\epsilon$ obtained in this way for several heat sinks made of different materials compared favorably with accepted published values.

For conditions approaching a black body, where the net emissivity $\epsilon_2$ approaches 1 as the limit and as a practical construction matter is of the order of 0.95 to 0.97 and the ratio $F_1/F_2$ is small, the net emissivity $\epsilon$ approaches as a limit the emissivity of the heat sink and for purposes of calculation may be considered equal thereto. The heat sink emissivity can be evaluated by making the surface of the heat sink of a material of known emissivity or determined from Equation II by using a calibrated thermal conductivity standard. The use of a thermal conductivity standard is preferred because any errors in surface area measurements, deviation from theoretical of the radiation shields, etc. tend to cancel out. Using the present apparatus the values of emissivity $\epsilon$ measured for heat sinks from several matreials and several conductivity standards compare favorably with accepted values.

It is apparent from Equation II that besides $\epsilon$, only the dimensions of the sample, and the heat sink, and the temperatures $T_0$ and $T_1$ have an influence on the range of applicability. Fortunately the more difficultly controlled and measurable factors drop out.

The full range of applicability and utility of the present concept are apparent from one embodiment thereof developed in conjunction with the accompanying drawing, in which.

Figure 1:
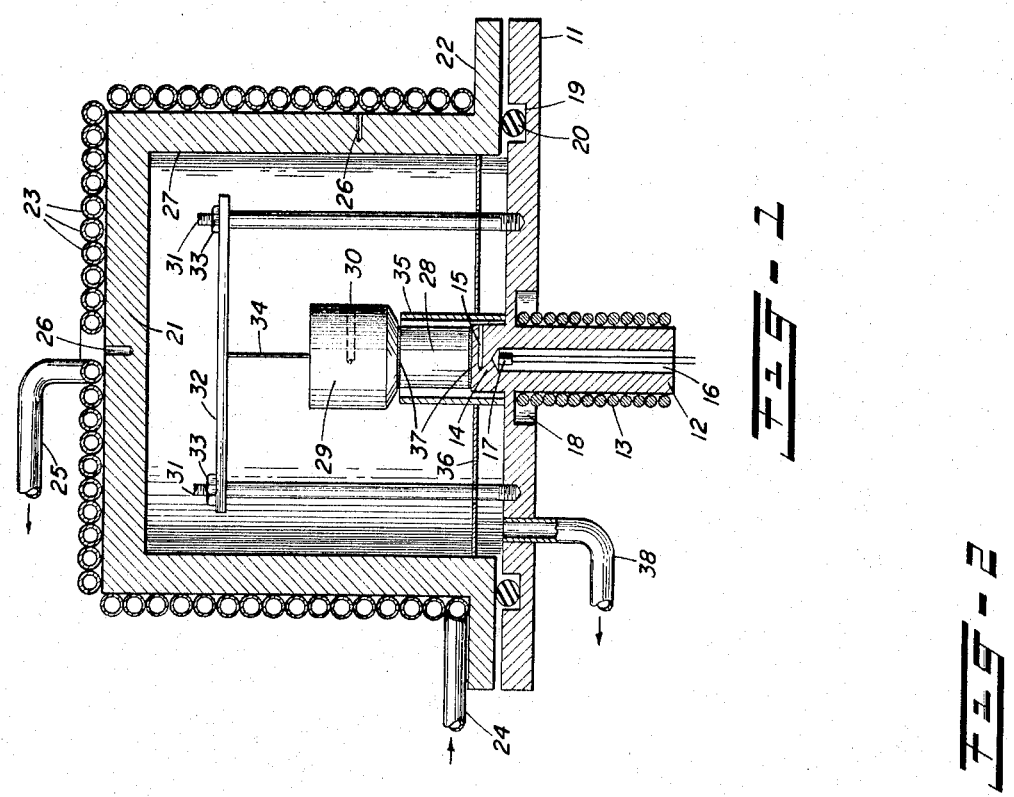
FIGURE 1 shows a cross-section of a thermal conductivity apparatus.

As shown in FIGURE 1, the thermal conductivity apparatus consists of a base 11, suitably supported, of a heat-conducting metal such as copper. Integral or in good heat transfer relationship therewith is a heated stud 12. Surrounding the heated stud is a heater element 13, conveniently an electrical resistance element wound about but electrically insulated from the heater stud. On the opposite side is a sample support 14, preferably also integral with the base. In the sample support 14 is a source thermocouple well 15. Interiorly of the heated stud and preferably extending closely adjacent the sample support is a thermostat well 16. Although many other conventional temperature control elements can be used, one convenient method of controlling the temperature of the sample support is to use a transistor 17, which is open circuited at the base, with the temperature dependent leakage current being amplified and used as the control for the power input to the heater element 13. A transistor amplifier which controls the current to the heater gives excellent regulation as the input current is continuously monitored and varied rather than the more common off-on regulation of many temperature controls. Such transistor controlled constant temperature sources are shown in the prior art, one such appearing in an article by M. W. Rignall, "Constant Temperature Transistor Enclosure," Electronic Engineering 33, 401, July 1961.

Surrounding the heated stud is an annular groove 18 in the base, to reduce the thickness, so that the thermal resistance from the central portion of the base adjacent the heater to the remainder of the base is increased.

On the top side of the base near the periphery is an annular sealed groove 19 containing an O-ring seal 20. Over the base and sealable thereto is a cup-shaped chamber 21 which has a flange 22. The flange 22 when in operation presses against the O-ring seal thus permitting evacuation of the chamber. On the outside of the chamber and in good thermal contact therewith is a coolant tube 23, conveniently of copper tubing close wound to surround substantially the entire outer surface of the cup-shaped chamber. The coolant tube is in good heat transfer relationship with the cup-shaped chamber itself. Both may be of copper or brass with the coolant tube being soldered to the cup-shaped chamber. The coolant tube is supplied with a constant temperature coolant through an inlet pipe 24, and discharges through an outlet pipe 25. The cup-shaped chamber has chamber wall thermocouple wells 26 for the measurement of the temperature of the chamber wall. The inside surface of the chamber is sand blasted and then sprayed with black stencil ink to give a slightly roughened black surface 27. Other treatments may be used to give a surface which approaches the characteristics of a black body.

Inside of the chamber and on the sample support 14 is placed the sample 28 and on top of the sample is the heat sink 29. The heat sink is of a material having a high thermal conductivity such as silver or copper. The outer surface is blackened as above, to approach the radiation characteristics of a black body. In the heat sink is a heat sink thermocouple well 30. To hold the heat sink in contact with the sample and the sample in contact with the sample support, two bolts 31 are fastened into the base 11 with a cross bar 32 between the bolts. The cross bar is held down by clamp nuts 33 which hold the cross bar down against a hold-down rod 34, of a material having a low heat conductivity such as a quartz rod. A quartz rod 1 mm. in diameter and 12 to 15 mm. in length is mechanically strong enough to hold the heat sink against the sample and the sample against the sample support with minimal heat losses by conduction. Surrounding the sample and sample support is a cylindrical radiation shield 35, which for convenience may be in two or more pieces to permit its lateral removal when placing the sample. A planar radiation shield 36 is placed slightly above the base to shield the inside of the cup-shaped chamber from radiation from the base. Preferably both radiation shields are of polished gold plate. The surface of the gold is a good heat reflector and the resistance of gold to tarnishing is well known. The upper side of the planar radiation shield is preferably, but not necessarily, treated to form a dim black surface. More than one such heat shield may be used and is advantageous for the measurement of lower conductivity values.

To insure maximum heat transfer from the sample support to the sample and from the sample to the heat sink a thin layer of silicone grease 37 is placed between both pairs of surfaces and the surfaces are polished and flat. From the inside of the chamber a vacuum line 38 runs to a vacuum pump. The vacuum pump is conveniently a diffusion pump backed with a mechanical fore pump. A vacuum of 0.1 micron or better insures that heat transfer by convection is minimal.

*Operation*

In operation a CK–66A transistor serves as a temperature sensor and keeps the temperature variations in the heat source to less than 0.1° C. With a chamber of 5 mm. thickness copper and 5 mm. I.D. copper tubing soldered to its outer surface, water from a thermostat was pumped through the copper tubing and maintained the temperature of the cup-shaped chamber constant within one-tenth of a degree. For convenience, both the cup-shaped chamber and the base were insulated with foamed styrene to minimize the effect of ambient temperatures. The thermocouples were conveniently of 40 gauge (0.08 mm.) copper-constantan. Thermocouples were placed in each of the source thermocouple well 15, chamber wall thermocouple well 26, and heat sink thermocouple well, 30. To avoid a confusing number of lines in the drawings, the wells only, and not the thermocouples and lead wires are shown in the drawing. For convenience, the potentials from the thermocouples were fed to a recorder to determine the rate of approaching temperature equilibrium. A recorder can be used for temperature measurement for rapid results, but more precise results are obtained using a potentiometer which is accurate to within three microvolts. Such instruments are sold commercially and are available in well-equipped laboratories. The temperature equilibrium is attained within one-half hour for high conductivity samples and within one and one-half hours for low conductivity samples.

The constants can be calculated but, conveniently and more readily, calibration samples are used.

Figure 2:
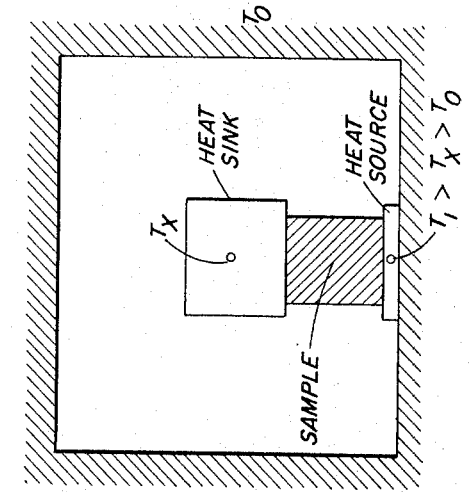
FIGURE 2 shows a simplified stylized theoretical chamber from which mathematical expressions are more easily ascertained.

FIGURE 2 shows the temperatures for theoretical analysis.

Figure 3:
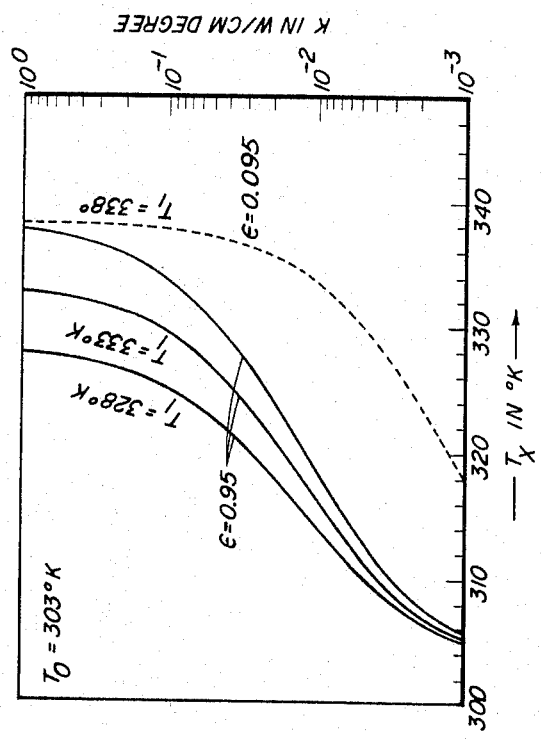
FIGURE 3 shows a plot of thermal conductivity, $\kappa$, against absolute temperature showing how straight line values are obtained over a very useful range.

In FIGURE 3 are shown curves for a chamber temperature of 303° K. with various source temperatures and with $\epsilon$, the net emissivity of 0.95 at temperatures of 328° K., 333° K., and 338° K. A dotted line shows the conductivity with an emissivity of 0.095. From the curves it can be seen that over the range of approximately $6 \times 10^{-3}$ to $3 \times 10^{-2}$ watts per centimeter degree the curves are essentially straight and, hence, interpolation is very convenient.

Lower thermal conductivities are more readily measured with a lower emissivity of a heat sink. The emissivity is about 0.02 for highly polished gold or silver, which furnishes a lower limit to accurate measurement of around $10^{-4}$ watts per centimeter degree although this can be extended if the relative sizes of the sample dimensions and heat sink are varied. Increasing the sample length, increasing the heat sink surface, and decreasing the sample cross-section permit raising the useful range of thermal conductivity measurements.

The present system is particularly useful for values of thermal conductivity of semi-conductors, around 0.1 to 0.005 watt per centimeter degree, although the range can be extended if desired.

For comparison, copper has a value of about 1, and good insulators such as the ceramics have values around 0.001.

Variations in the relative ratios of sizes, emissivities, temperature ranges both for studying the variation of thermal conductivity with temperature and for samples having various characteristics, suggest themselves to those skilled in the art from the above description. This specific example is illustrative only with the scope of the invention being defined in the appended claim.

I claim:

An apparatus for thermal conductivity measurement comprising: a sample support, means for maintaining the sample support at a substantially constant temperature, a heat sink, provision for incorporating a sample in heat exchanging relationship with each of and between the sample support and the heat sink, means for holding the heat sink against the sample and the sample against the sample support, a chamber surrounding the heat sink, and having a comparatively large area as compared with the heat sink, means for maintaining the chamber at a constant temperature, means for sealing and evacuating the space between the heat sink and said chamber, and means for measuring the temperature of each of the sample support, the heat sink, and the chamber.

References Cited by the Examiner
UNITED STATES PATENTS 2,484,736  10/1949  Razek _____ 73—15

RICHARD C. QUEISSER, *Primary Examiner.*

JACK C. GOLDSTEIN, *Assistant Examiner.*